United States Patent [19]

Dunne

[11] Patent Number: 5,078,979
[45] Date of Patent: * Jan. 7, 1992

[54] MOLECULAR SIEVE BED/CATALYST TO TREAT AUTOMOTIVE EXHAUST

[75] Inventor: Stephen R. Dunne, Bethel, Conn.

[73] Assignee: UOP, Des Plaines, Ill.

[*] Notice: The portion of the term of this patent subsequent to Sep. 24, 2008 has been disclaimed.

[21] Appl. No.: 555,953

[22] Filed: Jul. 20, 1990

[51] Int. Cl.$^5$ .............................................. B01D 53/36
[52] U.S. Cl. .............................. 423/212; 423/213.5; 423/213.7; 423/245.1; 423/247
[58] Field of Search ............... 423/213.5, 247, 212 C, 423/213.7, 245.1

[56] References Cited

U.S. PATENT DOCUMENTS

| | | | |
|---|---|---|---|
| 2,942,932 | 6/1960 | Elliott | 23/2 |
| 3,476,508 | 11/1969 | Kearby et al. | 423/213.5 |
| 3,699,683 | 10/1972 | Tourtellotte et al. | 60/274 |
| 3,767,453 | 10/1973 | Hoekstra | 117/46 CA |
| 3,785,998 | 1/1974 | Hoekstra | 252/477 R |
| 3,920,583 | 11/1975 | Pugh | 252/465 |
| 4,064,073 | 12/1977 | Pomet | 423/213.5 |
| 4,528,279 | 7/1985 | Suzuki et al. | 502/200 |
| 4,760,044 | 7/1988 | Joy et al. | 502/303 |
| 4,791,091 | 12/1988 | Bricker et al. | 502/303 |
| 4,868,148 | 9/1989 | Henk et al. | 502/303 |
| 4,868,149 | 9/1989 | Bricker | 502/303 |
| 4,985,210 | 1/1991 | Minami | 423/213.5 |

FOREIGN PATENT DOCUMENTS 1205980 6/1986 Canada .
3928760 8/1989 Fed. Rep. of Germany .

OTHER PUBLICATIONS

"Mutlicomponent Adsorption Equilibria on Molecular Sieves", C. M. Yon and P. H. Turnock AICHE Symposium Serial, No. 117, vol. 67, (1971).
D. W. Breck, "Zeolite Molecular Sieves", John Wiley & Sons., eds., N.Y., p. 426.

*Primary Examiner*—Wayne A. Langel
*Attorney, Agent, or Firm*—Thomas K. McBride; Eugene I. Snyder; Frank S. Molinaro

[57] ABSTRACT

This invention relates to a process for treating an exhaust gas stream from an engine, especially during cold start. The process involves a molecular sieve bed over which the cold exhaust is flowed before flowing over a catalyst bed. Pollutants such as hydrocarbons are adsorbed on the molecular sieve bed. When the molecular sieve bed reaches a temperature of about 150° C., the pollutants are desorbed from the adsorbent bed and converted by the catalyst to innocuous compounds. The molecular sieves used in the process are those that selectively adsorbs pollutants, e.g., hydrocarbons versus water, and are hydrothermally stable.

14 Claims, No Drawings

MOLECULAR SIEVE BED/CATALYST TO TREAT AUTOMOTIVE EXHAUST

BACKGROUND OF THE INVENTION

Gaseous waste products resulting from the combustion of hydrocarbonaceous fuels, such as gasoline and fuel oils, comprise carbon monoxide, hydrocarbons and nitrogen oxides as products of combustion or incomplete combustion, and pose a serious health problem with respect to pollution of the atmosphere. While exhaust gases from other carbonaceous fuel-burning sources, such as stationary engines, industrial furnaces, etc., contribute substantially to air pollution, the exhaust gases from automotive engines are a principal source of pollution. Because of these health problem concerns, the Environmental Protection Agency (EPA) has promulgated strict controls on the amounts of carbon monoxide, hydrocarbons and nitrogen oxides which automobiles can emit. The implementation of these controls has resulted in the use of catalytic converters to reduce the amount of pollutants emitted from automobiles.

In order to achieve the simultaneous conversion of carbon monoxide, hydrocarbon and nitrogen oxide pollutants, it has become the practice to employ catalysts in conjunction with air-to-fuel ratio control means which functions in response to a feedback signal from an oxygen sensor in the engine exhaust system. Although these three component control catalysts work quite well after they have reached operating temperature of about 300° C., at lower temperatures they are not able to convert substantial amounts of the pollutants. What this means is that when an engine and in particular an automobile engine is started up, the three component control catalyst is not able to convert the hydrocarbons and other pollutants to innocuous compounds. Despite this limitation, current state of the art catalysts are able to meet the current emission standards. However, California has recently set new hydrocarbon standards (these standards most probably will be promulgated nationwide) which can not be met with the current state of the art three component control catalysts.

Applicant has found a solution to this problem which involves the use of an adsorbent bed to adsorb the hydrocarbons during the cold start portion of the engine. Although the process will be exemplified using hydrocarbons, the instant invention can also be used to treat exhaust streams from alcohol fueled engines as will be shown in detail. Applicant's invention involves placing an adsorbent bed immediately before the catalyst. Thus, the exhaust stream is first flowed through the adsorbent bed and then through the catalyst. The adsorbent bed preferentially adsorbs hydrocarbons over water under the conditions present in the exhaust stream. After a certain amount of time, the adsorbent bed has reached a temperature (about 150° C.) at which the bed is no longer able to remove hydrocarbons from the exhaust stream. That is, hydrocarbons are actually desorbed from the adsorbent bed instead of being adsorbed. This regenerates the adsorbent bed so that it can adsorb hydrocarbons during a subsequent cold start.

The adsorbents which may be used to adsorb the hydrocarbons may be selected from the group consisting of molecular sieves which have 1) a Si:Al ratio of at least 2.4; 2) are hydrothermally stable; and 3) have a hydrocarbon selectivity greater than 1. Examples of molecular sieves which meet these criteria are silicalite, faujasites, clinoptilolites, mordenites and chabazite. The adsorbent bed may be in any configuration with a preferred configuration being a honeycomb monolithic carrier having deposited thereon the desired molecular sieve.

The prior art reveals several references dealing with the use of adsorbent beds to minimize hydrocarbon emissions during a cold start engine operation. One such reference is U.S. Pat. No. 3,699,683 in which an adsorbent bed is placed after both a reducing catalyst and an oxidizing catalyst. The patentees disclose that when the exhaust gas stream is below 200° C. the gas stream is flowed through the reducing catalyst then through the oxidizing catalyst and finally through the adsorbent bed, thereby adsorbing hydrocarbons on the adsorbent bed. When the temperature goes above 200° C. the gas stream which is discharged from the oxidation catalyst is divided into a major and minor portion, the major portion being discharged directly into the atmosphere and the minor portion passing through the adsorbent bed whereby unburned hydrocarbon is desorbed and then flowing the resulting minor portion of this exhaust stream containing the desorbed unburned hydrocarbons into the engine where they are burned.

Another reference is U.S. Pat. No. 2,942,932 which teaches a process for oxidizing carbon monoxide and hydrocarbons which are contained in exhaust gas streams. The process disclosed in this patent consists of flowing an exhaust stream which is below 800° F. into an adsorption zone which adsorbs the carbon monoxide and hydrocarbons and then passing the resultant stream from this adsorption zone into an oxidation zone. When the temperature of the exhaust gas stream reaches about 800° F. the exhaust stream is no longer passed through the adsorption zone but is passed directly to the oxidation zone with the addition of excess air.

Finally, Canadian Patent No. 1,205,980 discloses a method of reducing exhaust emissions from an alcohol fueled automotive vehicle. This method consists of directing the cool engine startup exhaust gas through a bed of zeolite particles and then over an oxidation catalyst and then the gas is discharged to the atmosphere. As the exhaust gas stream warms up it is continuously passed over the adsorption bed and then over the oxidation bed.

The problem with the prior art processes is that the adsorbents which were used are not selective. That is, water is adsorbed as easily as the pollutants which necessitates the use of large beds, which in turn means that the large bed acts as a heat sink, thereby cooling the exhaust and lengthening the time required to warm up the catalyst bed. Another problem with the adsorbents used in the prior art is that they have poor thermal durability and would not be able to meet the EPA durability requirements of at least 50,000 miles or 5 years. For these reasons, adsorbent beds have not been used in conjunction with catalysts to treat automotive exhaust streams.

Applicants have recognized this longfelt need and have solved the problems found in the prior art. This has been accomplished by the use of molecular sieves which selectively adsorb hydrocarbons and other pollutants over water. What this means is that the molecular sieve bed does not have to be very large in order to adsorb sufficient quantities of hydrocarbons and other pollutants during engine startup. Accordingly, the size of the adsorbent bed can be minimized so that the catalyst bed warms up as quickly as possible. Additionally, the molecular sieves which are used as the adsorbent are hydrothermally stable at temperatures of at least 750° C. This means that the adsorbent bed can meet the EPA requirements that catalysts have a durability of at least 50,000 miles or 5 years.

SUMMARY OF THE INVENTION

This invention generally relates to a process for treating an engine exhaust stream and in particular to a process for minimizing emissions during the cold start operation of an engine. Accordingly, one embodiment of the invention is a process for treating an engine exhaust gas stream containing pollutants comprising flowing said engine exhaust gas stream over a molecular sieve bed which preferentially adsorbs the pollutants over water to provide a first exhaust stream, and flowing the first exhaust gas stream over a catalyst to convert the pollutants contained in the first exhaust gas stream to innocuous products and provide a treated exhaust stream and discharging the treated exhaust stream into the atmosphere, the molecular sieve bed characterized in that it comprises at least one molecular sieve selected from the group consisting of molecular sieves which have: 1) a framework Si:Al ratio of at least 2.4; 2) are hydrothermally stable; and 3) have a hydrocarbon selectivity ($\alpha HC-H_2O$) greater than 1 where $\alpha HC-H_2O$ is defined by the following equation:

$$\alpha_{HC-H_2O} = \frac{X_{HC}}{X_{H_2O}} \cdot \frac{[H_2O]}{[HC]}$$

where $X_{HC}$ is the hydrocarbon co-loading on the molecular sieves in equilibrium with the hydrocarbon water vapor mixture in the gas phase over the molecular sieve adsorbent; $X_{H_2O}$ is the water co-loading on the molecular sieve in equilibrium with the water and hydrocarbon vapor mixture in the gas phase over the molecular sieve adsorbent; $[H_2O]$ is the concentration of water and $[HC]$ is the concentration of hydrocarbon.

Other objects and embodiments will become more apparent after a more detailed description of the invention.

DETAILED DESCRIPTION OF THE INVENTION

As stated this invention generally relates to a process for treating an engine exhaust stream and in particular to a process for minimizing emissions during the cold start operation of an engine. The engine consists of any internal or external combustion engine which generates an exhaust gas stream containing noxious components or pollutants including unburned or thermally degraded hydrocarbons or similar organics. Other noxious components usually present in the exhaust gas include nitrogen oxides and carbon monoxide. The engine may be fueled by a hydrocarbonaceous fuel. As used in this specification and in the appended claims, the term "hydrocarbonaceous fuel" includes hydrocarbons, alcohols and mixtures thereof. Examples of hydrocarbons which can be used to fuel the engine are the mixtures of hydrocarbons which make up gasoline or diesel fuel. The alcohols which may be used to fuel engines include ethanol and methanol. Mixtures of alcohols and mixtures of alcohols and hydrocarbons can also be used. The engine may be a jet engine, gas turbine, internal combustion engine, such as an automobile, truck or bus engine, a diesel engine or the like. The process of this invention is particularly suited for hydrocarbon, alcohol, or hydrocarbon-alcohol mixture, internal combustion engine mounted in an automobile. For convenience the description will use hydrocarbon as the fuel to exemplify the invention. The use of hydrocarbon in the subsequent description is not to be construed as limiting the invention to hydrocarbon fueled engines.

When the engine is started up, it produces a relatively high concentration of hydrocarbons in the engine exhaust gas stream as well as other pollutants. Pollutants will be used herein to collectively refer to any unburned fuel components and combustion byproducts found in the exhaust stream. For example, when the fuel is a hydrocarbon fuel, hydrocarbons, nitrogen oxides, carbon monoxide and other combustion byproducts will be found in the engine exhaust gas stream. The temperature of this engine exhaust stream is relatively cool, generally below 500° C. and typically in the range of 200° to 400° C. This engine exhaust stream has the above characteristics during the initial period of engine operation, typically for the first 30 to 120 seconds after startup of a cold engine. The engine exhaust stream will typically contain, by volume, about 500 to 1000 ppm hydrocarbons.

The engine exhaust gas stream which is to be treated is now flowed over a molecular sieve bed which contains at least one molecular sieve that has a high selectivity for hydrocarbons versus water to provide a first exhaust stream. The properties of the molecular sieves will be more fully explained herein. The first exhaust stream which is discharged from the molecular sieve bed is now flowed over a catalyst to convert the pollutants contained in the first exhaust stream to innocuous components and provide a treated exhaust stream which is discharged into the atmosphere. It is understood that prior to discharge into the atmosphere, the treated exhaust stream may be flowed through a muffler or other sound reduction apparatus well known in the art.

The catalyst which is used to convert the pollutants to innocuous components is usually referred to in the art as a three-component control catalyst because it can simultaneously oxidize any residual hydrocarbons present in the first exhaust stream to carbon dioxide and water, oxidize any residual carbon monoxide to carbon dioxide and reduce any residual nitric oxide to nitrogen and oxygen. In some cases the catalyst may not be required to convert nitric oxide to nitrogen and oxygen, e.g., when an alcohol is used as the fuel. In this case the catalyst is called an oxidation catalyst. Because of the relatively low temperature of the engine exhaust stream and the first exhaust stream, this catalyst does not function at a very high efficiency, thereby necessitating the molecular sieve bed.

When the molecular sieve bed reaches a temperature of about 150°-200° C., the pollutants which are adsorbed in the bed begin to desorb and are carried by the first exhaust stream over the catalyst. At this point the catalyst has reached its operating temperature and is therefore capable of fully converting the pollutants to innocuous components.

As stated, the molecular sieves which are used in the invention are those molecular sieves which meet the following criteria: 1) have a framework Si:Al ratio of at least 2.4; 2) are hydrothermally stable and 3) have a hydrocarbon selectivity ($\alpha HC-H_2O$) greater than 1.0. By hydrothermally stable is meant the ability of the molecular sieve to maintain its structure after thermal cycling in the exhaust gas stream. One method of measuring hydrothermal stability is to look at the temperature at which 50% of the structure is decomposed after heating for 16 hours in air. The temperature is referred to as T(50). Accordingly, as used in this application, by hydrothermally stable is meant a molecular sieve which has a T(50) of at least 750° C. The hydrocarbon selectivity α is defined by the following equation:

$$\alpha_{HC-H_2O} = \frac{X_{HC}}{X_{H_2O}} \cdot \frac{[H_2O]}{[HC]}$$

$X_{HC}$ = the hydrocarbon co-loading on the molecular sieve in equilibrium with the hydrocarbon water vapor mixture in the gas phase over the zeolite adsorbent;

$X_{H_2O}$ = the water co-loading on the molecular sieve in equilibrium with the water and hydrocarbon vapor mixture in the gas phase over the molecular sieve adsorbent;

$[H_2O]$ = the concentration of water vapor in the exhaust gas stream; and $[HC]$ = the concentration of the hydrocarbon species in the exhaust gas.

The above definitions show that the selectivity of molecular sieves for hydrocarbons over water is dependent upon the exhaust gas stream temperature, the particular hydrocarbon species of interest and the relative concentrations of water vapor and hydrocarbon.

In order to calculate $X_{HC}$ and $X_{H_2O}$ one needs to first determine the intrinsic adsorption strength of the molecular sieve. Intrinsic adsorption strength can be described by reference to the Dubinin Polanyi model for adsorption. The model says that the sorption expressed as the volume of the sorbent structure occupied by the sorbate is a unique function of the Gibbs Free Energy change on adsorption. Mathematically this relationship takes the form of a Gaussian distribution with Gibbs free energy change as follows:

$$X = \text{Liq. dens} \cdot VO \cdot \exp(-B \cdot G \cdot G)$$

where X is the loading expected, VO is the pore volume (cc/g), B is a constant that is dependent on the sorbent and sorbate, and G is the Gibbs Free Energy change. The product of liquid density and VO equates to the saturation loading, XO, for any pure compound by the Gurvitsch Rule. (see Breck, Zeolite Molecular Sieves, page 426.)

For ideal gases $G = RT \ln(P^O/P)$.

The constant B is then inversely related to the intrinsic adsorption strength. For example, if the hydrocarbon is benzene, a value of B of 0.04 for both benzene and water gives good results. The estimates of water and hydrocarbon co-loadings are made in the following way:

1) each individual component loading is estimated by use of the Dubinin Polanyi model as outlined above. For each compound present one needs to know the liquid phase density (approximating the sorbed phase density), the vapor pressure as a function of temperature, and the actual concentration of the species in the gas.

2) Once each pure component loading is calculated the function Φ is calculated as, $$\Phi = X/XO/(1 - X/XO)$$

where X/XO is the loading ratio or fraction of the pore volume filled by each component if it were present alone. Φ then represents the ratio of occupied pore volume to unoccupied pore volume.

3) The co-loadings are then calculated, accounting for each species present, by the formula, $$X_{mc} = XO \cdot \Phi/(1 + \Sigma \Phi)$$

$X_{mc}$ is the co-loading of each component on the zeolite. This procedure follows the Loading Ratio Correlation, which is described in "Multicomponent Adsorption Equilibria on Molecular Sieves", C. M. Yon and P. H. Turnock AlCHE Symposium Series, No. 117, Vol. 67 (1971).

Both natural and synthetic molecular sieves may be used as adsorbents. Examples of natural molecular sieves which can be used are faujasites, clinoptilolites, mordenites, and chabazite. Examples of synthetic molecular sieves which can be used are silicalite, Zeolite Y, ultrastable zeolite Y, ZSM-5. Of course mixtures of these molecular sieves both nautral and synthetic can be used.

The adsorbent bed used in the instant invention can be conveniently employed in particulate form or the adsorbent can be deposited onto a solid monolithic carrier. When particulate form is desired, the adsorbent can be formed into shapes such as pills, pellets, granules, rings, spheres, etc. In the employment of a monolithic form, it is usually most convenient to employ the adsorbent as a thin film or coating deposited on an inert carrier material which provides the structural support for the adsorbent. The inert carrier material can be any refractory material such as ceramic or metallic materials. It is desirable that the carrier material be unreactive with the adsorbent and not be degraded by the gas to which it is exposed. Examples of suitable ceramic materials include sillimanite, petalite, cordierite, mullite, zircon, zircon mullite, spondumene, alumina-titanate, etc. Additionally, metallic materials which are within the scope of this invention include metals and alloys as disclosed in U.S. Pat. No. 3,920,583 which are oxidation resistant and are otherwise capable of withstanding high temperatures.

The carrier material can best be utilized in any rigid unitary configuration which provides a plurality of pores or channels extending in the direction of gas flow. It is preferred that the configuration be a honeycomb configuration. The honeycomb structure can be used advantageously in either unitary form, or as an arrangement of multiple modules. The honeycomb structure is usually oriented such that gas flow is generally in the same direction as the cells or channels of the honeycomb structure. For a more detailed discussion of monolithic structures, refer to U.S. Pat. Nos. 3,785,998 and 3,767,453.

The adsorbent material, e.g., molecular sieve, is deposited onto the carrier by any convenient way well known in the art. A preferred method involves preparing a slurry using the molecular sieves and coating the monolithic honeycomb carrier with the slurry. The slurry can be prepared by means known in the art such as combining the appropriate amount of the molecular sieve and a binder with water. This mixture is then blended by using means such as sonification, milling, etc. This slurry is used to coat a monolithic honeycomb by dipping the honeycomb into the slurry, removing the excess slurry by draining or blowing out the channels, and heating to about 100° C. If the desired loading of molecular sieve is not achieved, the above process may be repeated as many times as required to achieve the desired loading. The size of the adsorbent bed is chosen such that at least 40% of the hydrocarbons in the exhaust stream discharged from the engine is adsorbed. Generally, this means that the size of the adsorbent bed varies from about 1 to about 3 liters. When the adsorbent is deposited on a monolithic honeycomb carrier, the amount of adsorbent on the carrier varies from about 100 to about 450 grams. It is desirable to optimize the volume of the adsorbent bed such that the catalyst downstream from the adsorbent bed is heated as quickly as possible while at the same time ensuring that at least 40% of the hydrocarbons in the exhaust stream are adsorbed on the adsorbent bed. It is preferred that the adsorbent be deposited on a monolithic honeycomb carrier in order to minimize the size of the adsorbent bed and the back pressure exerted on the engine.

Instead of depositing the molecular sieve onto a monolithic honeycomb structure, one can take the molecular sieve and form it into a monolithic honeycomb structure by means known in the art.

The adsorbent may optionally contain one or more catalytic metals dispersed thereon. The metals which can be dispersed on the adsorbent are the noble metals which consist of platinum, palladium, rhodium, ruthenium, and mixtures thereof. The desired noble metal may be deposited onto the adsorbent, which acts as a support, in any suitable manner well known in the art. One example of a method of dispersing the noble metal onto the adsorbent support involves impregnating the adsorbent support with an aqueous solution of a decomposable compound of the desired noble metal or metals, drying the adsorbent which has the noble metal compound dispersed on it and then calcining in air at a temperature of about 400° to about 500° C. for a time of about 1 to about 4 hours. By decomposable compound is meant a compound which upon heating in air gives the metal or metal oxide. Examples of the decomposable compounds which can be used are set forth in U.S. Pat. No. 4,791,091 which is incorporated by reference. Preferred decomposable compounds are chloroplatinic acid, rhodium trichloride, chloropalladic acid, hexachloroiridate (IV) acid and hexachlororuthenate. It is preferable that the noble metal be present in an amount ranging from about 0.01 to about 4 weight percent of the adsorbent support. Specifically, in the case of platinum and palladium the range is 0.1 to 4 weight percent, while in the case of rhodium and ruthenium the range is from about 0.01 to 2 weight percent.

These catalytic metals are capable of oxidizing the hydrocarbon and carbon monoxide and reducing the nitric oxide components to innocuous products. Accordingly, the adsorbent bed can act both as an adsorbent and as a catalyst.

The catalyst which is used in this invention is selected from any three component control or oxidation catalyst well known in the art. Examples of catalysts are those described in U.S. Pat. Nos. 4,528,279; 4,791,091; 4,760,044; 4,868,148; and 4,868,149, which are all incorporated by reference. Preferred catalysts well known in the art are those that contain platinum and rhodium and optionally palladium, while oxidation catalysts usually do not contain rhodium. Oxidation catalysts usually contain platinum and/or palladium metal. These catalysts may also contain promoters and stabilizers such as barium, cerium, lanthanum, nickel, and iron. The noble metals promoters and stabilizers are usually deposited on a support such as alumina, silica, titania, zirconia, alumino silicates, and mixtures thereof with alumina being preferred. The catalyst can be conveniently employed in particulate form or the catalytic composite can be deposited on a solid monolithic carrier with a monolithic carrier being preferred. The particulate form and monolithic form of the catalyst are prepared as described for the adsorbent above.

The following examples are presented in illustration of this invention and are not intended as undue limitations on the generally broad scope of the invention as set out in the appended claims.

EXAMPLE 1

A slurry was prepared using Y-54 and Ludox AS-40 binder. Y-54 is an ultrastable sodium Y zeolite with a $SiO_2/Al_2O_3$ ratio of 5, an $A_o$ of 24.68 Å and a Na/Al ratio of 0.93. Y-54 is produced and was obtained from UOP. Ludox AS-40 is an ammonium stabilized colloidal silica containing 40 weight percent solids with 20 micron spherical $SiO_2$ particles and is available from DuPont Corp. To 141 grams of distilled water, there was added 100 grams of Ludox AS-40. To this mixture there were added 191 grams of Y-54 zeolite and then 551 grams of water. This mixture was sonified for 10 minutes using a Sonifier Cell Disruptor 350.

A ceramic monolithic honeycomb carrier manufactured by Corning Glass Works measuring 28 mm in diameter by 50 mm in length was dipped into the slurry, pulled out and allowed to drain. The wet honeycomb was air dried and then heated at 100° C. for 1 hour. The monolith contained 4.1 grams of zeolite plus binder. This sample was designated sample A.

EXAMPLE 2

A monolithic honeycomb was prepared as in Example 1 except that the adsorbent used was Y-84. Y-84 is the ammonium form of stabilized Y zeolite with an $A_o$ of 24.55 Å, an $NH_4/Al$ of 0.3 and a Na/Al of less than 0.01. Y-84 was also obtained from UOP. This sample contained 4.2 grams of zeolite plus binder and was designated sample B.

EXAMPLE 3

A monolithic honeycomb was prepared as in Example 1 except that the adsorbent used was SA-15. Sa-15 is a steamed form of Y-84 with an $A_o$ of 24.29 Å and $NH_4/Al$ and a Na/Al ratio of less than 0.01. This sample contained 5.5 grams of zeolite plus binder and was designated sample C.

EXAMPLE 4

Samples A, B and C were tested to determine their hydrocarbon adsorption properties by using the following test procedure. The sample to be tested, measuring 28 mm in diameter by 50 mm in length and having a volume of 30.8 cc was placed in a tubular glass reactor. Over this adsorbent bed there was flowed a gas stream containing 998 ppm of propylene, 17,570 ppm of water and the remainder nitrogen. The test was run by starting with a cold (room temperature) adsorbent bed and gas stream flowing the gas stream at a flow rate of 7 Standard Liters Per Minute (SLPM) over the adsorbent while heating the gas stream from about 25° C. to about 360° C. in approximately 400 seconds.

The hydrocarbon retention was calculated by integrating the difference between the instantaneous mass flow of hydrocarbons into and out of the adsorbent. The percentage of the hydrocarbons retained was calculated by dividing the net hydrocaron retention by the integral of the hydrocarbons flowed into the bed. Plots of hydrocarbon retention versus time for samples A, B and C are presented in FIG. 2.

The results presented in FIG. 2 shows that sample A has the largest initial value of hydrocarbon retention, but the retention falls off quickly. Samples B and C have lower initial retention but fall off more slowly with sample B being the best. It is clear from this test that any of the three zeolites tested can be used to selectively adsorb hydrocarbons during the cold-start phase of an automobile engine.

Thus, having described the invention in detail, it will be understood by those skilled in the art that certain variations and modifications may be made without departing from the spirit and scope of the invention as defined herein and in the appended claims.

I claim as my invention:

1. A process for treating a cold-start engine exhaust gas stream containing hydrocarbons and other pollutants consisting of flowing said engine exhaust gas stream over a molecular sieve bed which preferentially adsorbs the hydrocarbons over water to provide a first exhaust stream, and flowing the first exhaust gas stream over a catalyst to convert any residual hydrocarbons and other pollutants contained in the first exhaust gas stream to innocuous products and provide a treated exhaust stream and discharging the treated exhaust stream into the atmosphere, the molecular sieve bed characterized in that it comprises at least one molecular sieve selected from the group consisting of molecular seives which have: 1) a framework Si:Al ratio of at least 2.4; 2) are hydrothermally stable; and 3) have a hydrocarbon selectivity ($\alpha$HC-H$_2$O) greater than 1 where $\alpha$HC-H$_2$O is defined by the following equation:

$$\alpha_{HC-H_2O} = \frac{X_{HC}}{X_{H_2O}} \cdot \frac{[H_2O]}{[HC]}$$

where $X_{HC}$ is the hydrocarbon co-loading on the molecular sieves in equilibrium with the hydrocarbon water vapor mixture in the gas phase over the molecular sieve adsorbent; $X_{H_2O}$ is the water co-loading on the molecular sieve in equilibrium with the water and hydrocarbon vapor mixture in the gas phase over the molecular sieve adsorbent; [H$_2$O] is the concentration of water and [HC] is the concentration of hydrocarbon.

2. The process of claim 1 where the molecular sieve is selected from the group consisting of silicalite, faujasite, clinoptilolites, mordenites, chabazite, zeolite ultrastable Y, zeolite Y, ZSM-5 and mixtures thereof.

3. The process of claim 2 where the molecular sieve is faujasite.

4. The process of claim 2 where the molecular sieve is zeolite ultrastable Y.

5. The process of claim 1 wherein the molecular sieve bed is a honeycomb monolithic carrier having deposited thereon a molecular sieve.

6. The process of claim 1 where the engine is an internal combustion engine.

7. The process of claim 6 where the internal combustion engine is an automobile engine.

8. The process of claim 1 where the engine is fueled by a hydrocarbonaceous fuel.

9. The process of claim 8 where the fuel is an alcohol.

10. The process of claim 8 where the fuel is a hydrocarbon.

11. The process of claim 1 where the molecular sieve has deposited thereon a metal selected from the group consisting of platinum, palladium, rhodium, ruthenium and mixtures thereof.

12. The process of claim 11 where the metal is platinum.

13. The process of claim 11 where the metal is palladium.

14. The process of claim 11 where the metal is a mixture of platinum and palladium.

* * * * *